US012639209B2

(12) United States Patent
Rudelic et al.

(10) Patent No.: US 12,639,209 B2
(45) Date of Patent: May 26, 2026

(54) RESERVED MEMORY SPACE IN COMPUTATIONAL STORAGE DEVICES

(71) Applicant: SK Hynix NAND Product Solutions Corp., Rancho Cordova, CA (US)

(72) Inventors: John Rudelic, Rancho Cordova, CA (US); Steven Williams, Longmont, CO (US); Vincent Lazo, San Dimas, CA (US); Samuel Bradshaw, Sacramento, CA (US)

(73) Assignee: SK Hynix Nand Product Solutions Corp, Rancho Cordova, CA (US)

( * ) Notice: Subject to any disclaimer, the term of this patent is extended or adjusted under 35 U.S.C. 154(b) by 0 days.

(21) Appl. No.: 18/767,846

(22) Filed: Jul. 9, 2024

(65) Prior Publication Data

US 2026/0017184 A1      Jan. 15, 2026

(51) Int. Cl.
 *G06F 12/02*          (2006.01)
 *G06F 15/78*          (2006.01)
(52) U.S. Cl.
 CPC ...... *G06F 12/0246* (2013.01); *G06F 15/7821* (2013.01); *G06F 2212/7202* (2013.01)
(58) Field of Classification Search
 None
 See application file for complete search history.

(56) References Cited

U.S. PATENT DOCUMENTS

| | | |
|---|---|---|
| 5,606,660 A | 2/1997 | Estakhri et al. |
| 12,050,531 B2 * | 7/2024 | Punniyamurthy .. G06F 12/0292 |

| | | | |
|---|---|---|---|
| 2007/0192529 A1 | 8/2007 | Roh et al. | |
| 2007/0260784 A1 | 11/2007 | Takamatsu et al. | |
| 2008/0288711 A1 | 11/2008 | Jung et al. | |
| 2010/0115170 A1 | 5/2010 | Jeong | |
| 2011/0161346 A1 | 6/2011 | Solihin | |
| 2017/0024166 A1 | 1/2017 | Singh et al. | |
| 2017/0315730 A1 | 11/2017 | Hashimoto et al. | |
| 2019/0121547 A1 | 4/2019 | Frolikov | |
| 2019/0310892 A1 * | 10/2019 | Frolikov ............... | G06F 9/5083 |
| 2021/0311633 A1 * | 10/2021 | Bates .................... | G06F 3/0673 |
| 2022/0206869 A1 * | 6/2022 | Ramachandran ..... | G06F 3/0673 |
| 2022/0244886 A1 | 8/2022 | Yang | |
| 2022/0244888 A1 | 8/2022 | Yang | |

(Continued)

OTHER PUBLICATIONS

Microsoft. Microsoft Computer Dictionary. 2002. Microsoft Press. pp. 29.*

(Continued)

*Primary Examiner* — Nathan Sadler
(74) *Attorney, Agent, or Firm* — Morgan, Lewis & Bockius LLP

(57) ABSTRACT

This application is directed to memory space management in a memory system that includes a memory controller, a data processor distinct from the memory controller, and a non-volatile memory (e.g., NAND flash memory). The non-volatile memory includes a plurality of memory blocks. The data processor executes a first program to process first data. In accordance with a determination that the first data is processed by the first program, the first data is in a first subset of the plurality of memory blocks. The first subset of the plurality of memory blocks has fixed physical locations in the non-volatile memory and is reserved for the first program.

20 Claims, 7 Drawing Sheets

(56)                References Cited

U.S. PATENT DOCUMENTS

| | | | |
|---|---|---|---|
| 2023/0130969 A1* | 4/2023 | Dutu | G11C 11/54 |
| | | | 365/189.05 |
| 2023/0195645 A1* | 6/2023 | Puthoor | G06F 12/0238 |
| | | | 711/209 |
| 2023/0244618 A1 | 8/2023 | Hillel et al. | |
| 2023/0259404 A1* | 8/2023 | Pinto | G06F 9/5027 |
| | | | 718/104 |
| 2023/0393849 A1* | 12/2023 | Kotra | G06F 9/3877 |
| 2024/0020229 A1 | 1/2024 | Liu et al. | |
| 2024/0143517 A1* | 5/2024 | Ramanathan | G06F 12/1483 |
| 2024/0152397 A1* | 5/2024 | Hong | G06F 9/5011 |
| 2024/0201888 A1 | 6/2024 | Cariello et al. | |
| 2024/0281381 A1* | 8/2024 | Lin | G06F 12/10 |
| 2024/0362169 A1 | 10/2024 | Bi et al. | |
| 2024/0403053 A1* | 12/2024 | Kim | G06F 9/30145 |

OTHER PUBLICATIONS

SK Hynix NAND Product Solutions Corp. (dba Solidigm), PCT/
US2025/036865, International Search Report and Written Opinion
dated Nov. 13, 2025, 11 pgs.
Alcantara Silva Costa et al., U.S. Appl. No. 18/767,876, Non-Final
Office Action, Aug. 12, 2025, 11 pgs.

* cited by examiner 204A, 204B, and 204N: collectively 204
206A and 206B: collectively 206
214A, 214B, and 214N: collectively 214
216A, 216B, and 216N: collectively 216

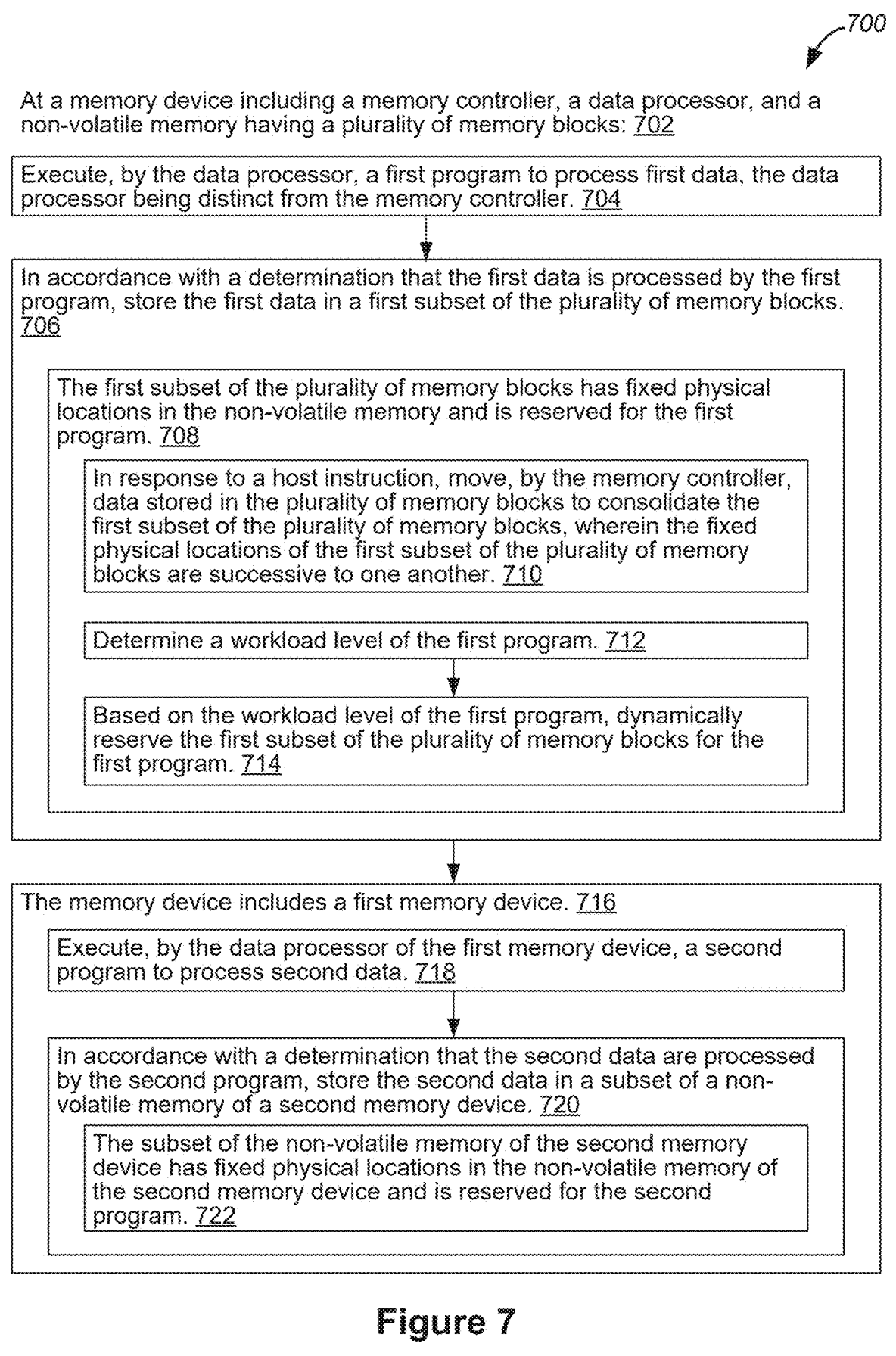

700

At a memory device including a memory controller, a data processor, and a non-volatile memory having a plurality of memory blocks: 702

Execute, by the data processor, a first program to process first data, the data processor being distinct from the memory controller. 704

In accordance with a determination that the first data is processed by the first program, store the first data in a first subset of the plurality of memory blocks. 706

The first subset of the plurality of memory blocks has fixed physical locations in the non-volatile memory and is reserved for the first program. 708

In response to a host instruction, move, by the memory controller, data stored in the plurality of memory blocks to consolidate the first subset of the plurality of memory blocks, wherein the fixed physical locations of the first subset of the plurality of memory blocks are successive to one another. 710

Determine a workload level of the first program. 712

Based on the workload level of the first program, dynamically reserve the first subset of the plurality of memory blocks for the first program. 714

The memory device includes a first memory device. 716

Execute, by the data processor of the first memory device, a second program to process second data. 718

In accordance with a determination that the second data are processed by the second program, store the second data in a subset of a non-volatile memory of a second memory device. 720

The subset of the non-volatile memory of the second memory device has fixed physical locations in the non-volatile memory of the second memory device and is reserved for the second program. 722

Figure 7

RESERVED MEMORY SPACE IN COMPUTATIONAL STORAGE DEVICES

RELATED APPLICATION

This application is related to U.S. patent application Ser. No. 18/767,876, filed Jul. 9, 2024, titled, "Multi-Processor Block Based NAND Memory Access Interfaces," which is incorporated by reference by its entirety.

TECHNICAL FIELD

This application relates generally to resource management in a memory system including, but not limited to, methods, systems, and non-transitory computer-readable media for managing memory space to facilitate internal processing capabilities on a memory device.

BACKGROUND

Memory is applied in a computer system to store instructions and data. The data are processed by one or more processors of the computer system according to the instructions stored in the memory. Multiple memory units are used in different portions of the computer system to serve different functions. Specifically, the computer system includes non-volatile memory that acts as secondary memory to keep data stored thereon if the computer system is decoupled from a power source. Examples of the secondary memory include, but are not limited to, hard disk drives (HDDs) and solid-state drives (SSDs). The secondary memory relies on a memory controller to manage its memory space and process read, write, and re-write requests from a host device efficiently with low latency.

SUMMARY

Various embodiments of this application are directed to methods, systems, devices, non-transitory computer-readable media for reserving part of a nonvolatile memory of a memory device to facilitate implementations of data processing operations locally in the memory device. The memory device is transformed to a computational storage device (CSD) by incorporating a data processor. The data processor is configured to process internal computational workloads (e.g., the data processing operations) locally on the memory device 240, while a memory controller of the memory device 240 specializes in performing memory access functions and internal memory management functions. Part of the nonvolatile memory of the memory device is reserved as working memory for the data processor of the memory device. In an example, the memory device is configured to implement data processing using a neural network based model, and the working memory reserved for the data processor of the memory device helps the data processor apply the neural network based model to process data locally in the memory device efficiently.

In one aspect, a method is implemented at a memory device to manage memory space. The memory device includes a memory controller, a data processor, and a non-volatile memory having a plurality of memory blocks. The method includes executing, by the data processor, a first program to process first data. The data processor is distinct from the memory controller. The method further includes in accordance with a determination that the first data is processed by the first program, storing the first data in a first subset of the plurality of memory blocks. The first subset of the plurality of memory blocks has fixed physical locations in the non-volatile memory and is reserved for the first program.

Some implementations of this application are directed to creating local working memory for an SSD memory system using its memory blocks (e.g., including a plurality of NAND memory cells). The local working memory includes a set of private memory blocks, and may support one or more of a temporary file system, a swap space, and an input and output buffer. In some embodiments, the private memory blocks are separate from (e.g., are not addressable to) a host device coupled to the memory system, and the host device and the memory controller of the memory system may not read or write directly from the private memory blocks. In some embodiments, the local working memory is fixed, e.g., independently of a workload of the data processor of the memory system. Conversely, in some embodiments, the local working memory is dynamically allocated based on a workload of the data processor of the memory system. In some embodiments, the local working memory is formatted to one of single-level cell (SLC) memory, multi-level cell (MLC) memory, triple-level cell (TLC) memory, quad-level cell (QLC) memory, penta-level cell (PLC) memory, and higher-level cell memory. Further, in some embodiments, the local working memory is dynamically formatted as single-level cell (SLC) memory or quad-level cell (QLC) memory. In some embodiments, the data processor of the memory system is configured to process virtual or containerized workloads. In some embodiments, two or more distinct memory devices of the memory system have distinct data processors, and the distinct data processors share the local working memory reserved in the non-volatile memory of one of the distinct memory devices in the memory system.

In another aspect, some implementations include a memory system or a memory device (e.g., SSDs) that includes a memory controller, a data processor distinct from the memory controller, a non-volatile memory coupled to the memory controller, and memory having instructions stored thereon for performing any of the above methods of managing memory space.

In yet another aspect, some implementations include a non-transitory computer readable storage medium storing one or more programs. The one or more programs include instructions, which when executed by a memory system (e.g., SSDs) or a memory device (e.g., an SSD) cause the memory system or the memory device to implement any of the above methods to manage memory space.

In another aspect, a memory device includes a non-volatile memory, a memory controller, and a data processor. The non-volatile memory has a plurality of memory blocks, and the plurality of memory blocks including a first subset of memory blocks that has fixed physical locations in the non-volatile memory and is reserved for a first program. The memory controller is coupled to the non-volatile memory, and is configured to couple the non-volatile memory to a host interface and access the plurality of memory blocks. The data processor is coupled to the non-volatile memory. The data processor is configured to execute the first program to process first data, and in accordance with a determination that the first data is processed by the first program, store the first data in a first subset of memory blocks. The first subset of memory blocks has fixed physical locations in the non-volatile memory and is reserved for the first program.

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 7 is a flow diagram of an example method for managing memory space, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with storage capabilities.

Figure 1:
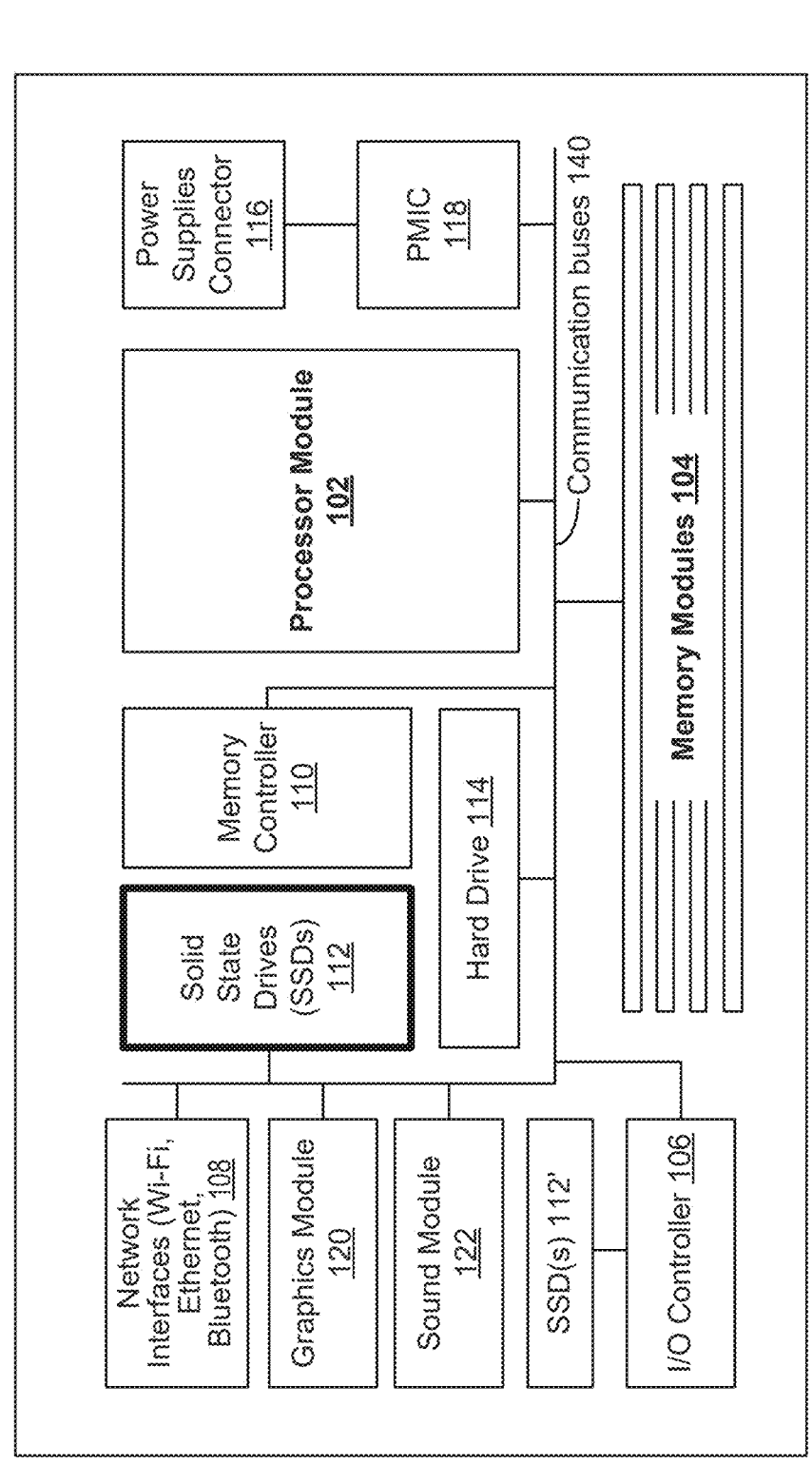
FIG. 1 is a block diagram of an example system module in a typical electronic device in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a trackpad) via a universal serial bus interface. In some embodiments, the network interfaces 108 includes one or more interfaces for Wi-Fi, Ethernet and Bluetooth networks, each allowing the electronic system to exchange data with an external source, e.g., a server or another electronic system. In some embodiments, the communication buses 140 include circuitry (sometimes called a chipset) that interconnects and controls communications among various system components included in system module 100.

In some embodiments, the memory modules 104 include high-speed random-access memory, such as static random-access memory (SRAM), double data rate (DDR) dynamic random-access memory (DRAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSD(s) 112, an HDD 114, power management integrated circuit (PMIC) 118, a graphics module 120, and a sound module 122. The memory controller 110 is configured to control communication between the processor module 102 and memory components, including the memory modules 104, in the electronic system. The SSD(s) 112 are configured to apply integrated circuit assemblies to store data in the electronic system, and in many embodiments, are based on NAND or NOR memory configurations. The HDD 114 is a conventional data storage device used for storing and retrieving digital information based on electro-mechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. The graphics module 120 is configured to generate a feed of output images to one or more display devices according to their desirable image/video formats. The sound module 122 is configured to facilitate the input and output of audio signals to and from the electronic system under control of computer programs.

Alternatively or additionally, in some embodiments, the system module 100 further includes SSD(s) 112' coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSD(s) 112 or 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
FIG. 2 is a block diagram of a memory system of an example electronic device having one or more memory access queues, in accordance with some embodiments.

FIG. 2 is a block diagram of a memory system 200 of an example electronic device having one or more memory access queues, in accordance with some embodiments. The memory system 200 is coupled to a host device 220 (e.g., a processor module 102 in FIG. 1) and configured to store instructions and data for an extended time, e.g., when the electronic device sleeps, hibernates, or is shut down. The host device 220 is configured to access the instructions and data stored in the memory system 200 and process the instructions and data to run an operating system and execute user applications. The memory system 200 includes one or more memory devices 240 (e.g., SSD(s)). Each memory device 240 further includes a controller 202 and a plurality of memory channels 204 (e.g., channel 204A, 204B, and 204N). Each memory channel 204 includes a plurality of memory cells. The controller 202 is configured to execute firmware level software to bridge the plurality of memory channels 204 to the host device 220. In some embodiments, each memory device 240 is formed on a printed circuit board (PCB).

Each memory channel 204 includes on one or more memory packages 206 (e.g., two memory dies). In an example, each memory package 206 (e.g., memory package 206A or 206B) corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory device 240 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory device 240 stores information of an ordered list of superblocks in a cache of the memory device 240. In some embodiments, the cache is managed by a host driver of the host device 220, and called a host managed cache (HMC).

In some embodiments, the memory device 240 includes a single-level cell (SLC) NAND flash memory chip, and each memory cell stores a single data bit. In some embodiments, the memory device 240 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 (e.g., controller 214A, 214B, or 214N) configured to control internal and external requests to access memory cells in the respective memory channel 204. In some embodiments, each memory package 206 (e.g., each memory die) corresponds to a respective queue 216 (e.g., queue 216A, 216B, or 216N) of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory device 240 corresponds to a single queue 216 of memory access requests. Each memory access request is optionally received internally from the memory device 240 to manage the respective memory channel 204 or externally from the host device 220 to write or read data stored in the respective channel 204. Specifically, each memory access request includes one of: a system write request that is received from the memory device 240 to write to the respective memory channel 204, a system read request that is received from the memory device 240 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller 202 to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory device 240, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n–k) corresponds to integrity data of the user data, where k and n are positive integers. In some embodiments, the memory device 240 includes an integrity engine 230 (e.g., an LDPC engine) and registers 232, which include a plurality of registers or SRAM cells or flip-flops and are coupled to the integrity engine 230. The integrity engine 230 is coupled to the memory channels 204 via the channel controllers 214 and SRAM buffer 224. Specifically, in some embodiments, the integrity engine 250 has data path connections to the SRAM buffer 224, which is further connected to the channel controllers 214 via data paths that are controlled by the local memory processor 218. The integrity engine 230 is configured to verify data integrity and correct bit errors for each coding block of the memory channels 204.

In some embodiments, the memory system 200 includes an SSD having an L2P address indirection table 250 that stores physical addresses for a set of logical addresses, e.g., a logical block address (LBA). In some embodiments, the L2P address indirection table 250 is stored in an L2P table cache 212 included in the controller 202. Alternatively, in some embodiments, the memory system 200 includes a DRAM buffer 228A, and the L2P address indirection table 250 is stored in the DRAM buffer 228A. The local memory processor 218 of the controller 202 accesses the DRAM buffer 228A via a DRAM controller 226.

Figure 3:
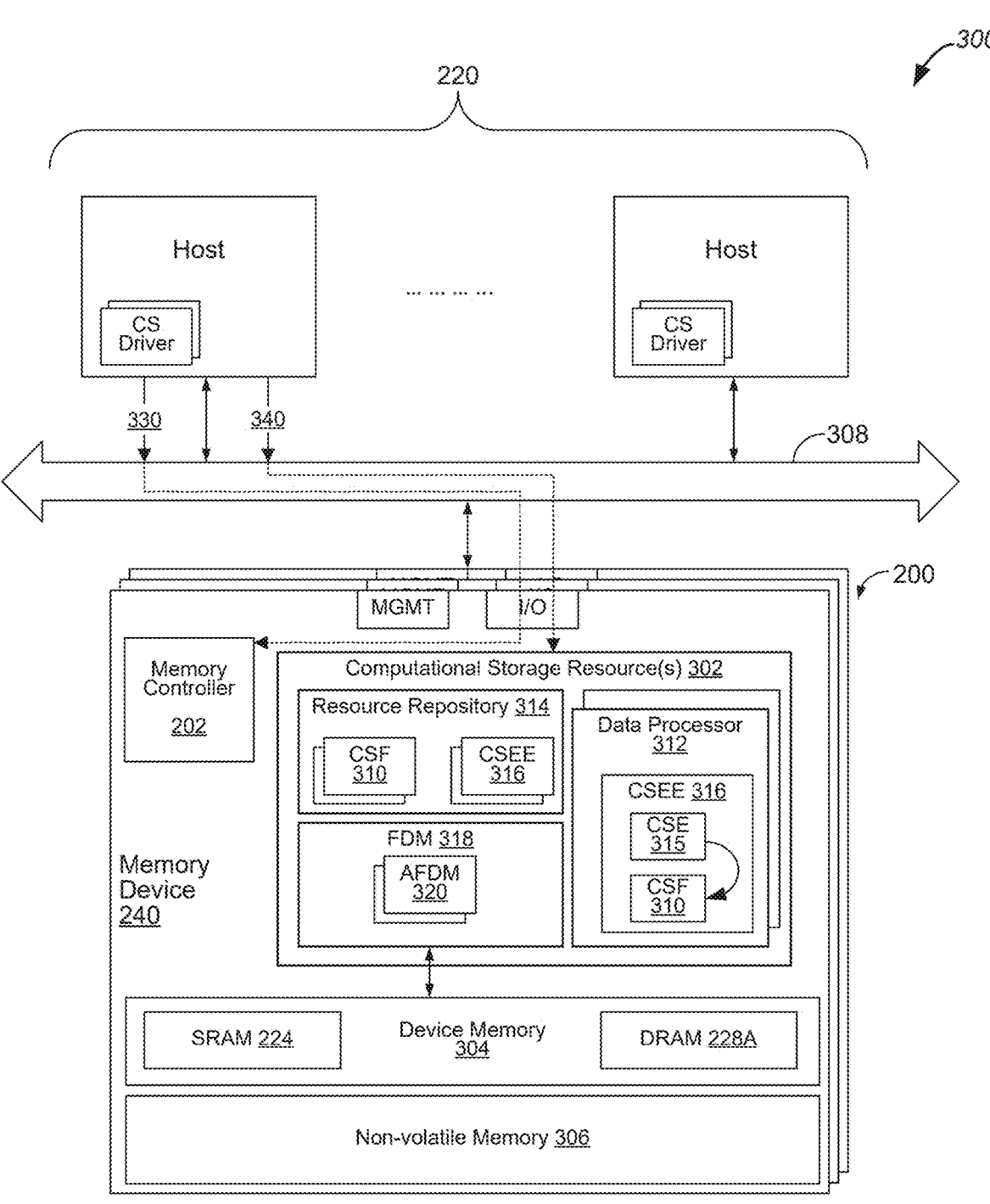
FIG. 3 is a block diagram of an example computer system that includes a memory system having an internal processing capability, in accordance with some embodiments.

FIG. 3 is a block diagram of an example computer system 300 that includes a memory system 200 having an internal processing capability, in accordance with some embodiments. The memory system 200 is also called a computational storage device (CSD), and includes one or more memory devices 240 (e.g., SSDs). Each memory device 240 further includes a memory controller 202, a device memory 304, and a non-volatile memory 306 (e.g., memory channels 204). The host device(s) 220 and the one or more memory devices 240 of the memory system 200 are coupled to each other via a communication fabric 308. The communication fabric 308 includes a communication bus 140 (FIG. 1) that operates in compliance with a data bus standard, e.g., Peripheral Component Interconnect Express (PCIe), Ethernet standards. The host device(s) 220 are configured to issue memory access requests to write data into, and read data from, the non-volatile memory 306. The memory controller 202 accesses the non-volatile memory 306 in response to the memory access operations. Additionally, in some embodiments, the memory controller 202 dispatch system read requests (also called background read requests or non-host read requests) and system write requests to implement internal memory management functions including, but are not limited to, garbage collection, wear levelling, read disturb mitigation, memory snapshot capturing, memory mirroring, caching, and memory sparing. The device memory 304 of each memory device 240 further includes one or more of a L2P table cache 212, a SRAM buffer 224, and a DRAM buffer 228A, and is configured to store data temporarily while the memory controller 202 accesses the non-volatile memory 306 for memory accesses or internal memory management.

In some embodiments, the memory controller 202 is dedicated to processing the memory access requests and internal memory management functions. A memory device 240 further includes one or more computational storage resources (CSRs) 302 configured to implement data processing operations locally on the memory device 240. A set of predefined data processing operations are implemented to perform a computational storage function (CSF) 310, which is distinct from the memory access and internal memory management functions performed by the memory controller 202. In some embodiments, a computational storage resource 302 processes user data that are received from the host device(s) 220 or extracted from the non-volatile memory 306 during the data processing operations. In some embodiments, the processed data are stored into the non-volatile memory 306 or sent to the host device(s) 220 via the fabric 308. Further, in some embodiments, a subset of the user data, the process data, and intermediate data generated during the data processing operations is temporarily stored in the device memory 304 (e.g., SRAM buffer 224, DRAM buffer 228A).

In some embodiments, the computational storage resource 302 includes one or more data processors 312 and a resource repository 314. The one or more data processors 312 provide a computational storage engine configured to perform one or more predefined data processing operations, e.g., associated with a computational storage function 310 of the computational storage resource 302. In some embodiments, the computational storage function 310 corresponds to an in-memory application associated with the computational storage engine, and is implemented via the computational storage engine in the memory device 240. The resource repository 314 is a centralized location (e.g., memory space) storing various types of data and resources, such as software libraries, configuration files, media files, or any other type of data needed for a plurality of computational storage functions 310 performed by the computational storage resource 302. For example, the resource repository 314 stores instructions for creating a computational storage engine environment (CSEE) 316 and instructions for implementing a set of data processing operations associated with a computational storage function 310 in the CSEE 316. Instructions are loaded from the resource repository 314 and executed by the data processor 312, thereby creating the CSEE 316 where the computational storage engine 315 is executed to implement data processing operations associated with the computational storage function 310.

In some embodiments, the computational storage resource 302 further includes a function data memory (FDM) 318 for storing data that are used or generated by the computational storage engine 315 for performing a computational storage function 310. In some embodiments, the function data memory 318 is included in the device memory 304. For example, the function data memory 318 corresponds to a portion of the DRAM buffer 228A (FIG. 2). In another example, the function data memory 318 corresponds to a portion of the SRAM buffer 224 (FIG. 2). Further, in some embodiments, a portion of the function data memory 318 (also called an allocated FDM (AFDM) 320) is allocated for one or more instances of a computational storage function 310.

In some embodiments, a host device 220 issues a memory read or write request 330 to a memory device 240 of the memory system 200, and the memory controller 202 of the memory device 240 receives the memory read or write request 330 and accesses the non-volatile memory 306 accordingly. Alternatively, in some embodiments, a host device 220 issues a data processing request 340 to the memory device 240, and a data processor 312 of the computational storage resource 302 (e.g., the computational storage engine 315) receives the data processing request 340 and processes user data extracted from the data processing request or the non-volatile memory 306.

Figure 4:
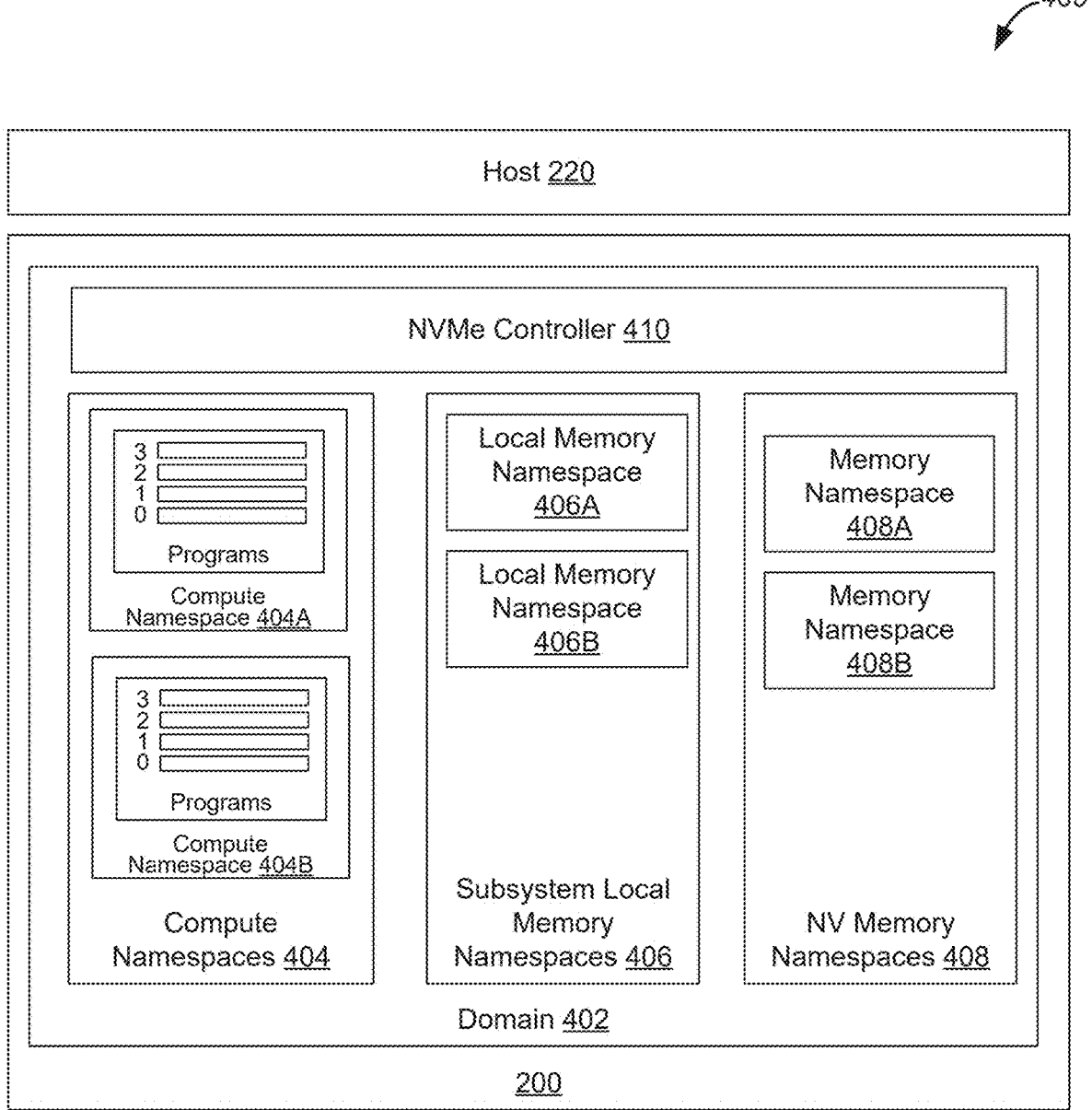
FIG. 4 is a block diagram of an example computer system including a memory system that operates in compliance with a storage access and transport protocol, in accordance with some embodiments.

FIG. 4 is a block diagram of an example computer system 400 including a memory system 200 that operates in compliance with a storage access and transport protocol (e.g., nonvolatile memory express (NVMe)), in accordance with some embodiments. The memory system 200 includes one or more memory devices 240 each of which corresponds to a domain 402 according to the storage access and transport protocol. Each domain 402 corresponding to a respective memory device 240 includes a one or more compute namespace 404, local memory namespaces 406, memory namespaces 408, and a domain controller 410. Each namespace is a collection of LBAs accessible to, or associated with, a respective one of the plurality of programs.

A memory device 240 includes one or more processors having a computation capability (e.g., a memory controller 202, a data processor 312), a device memory 304 (e.g., a cache 212, a SRAM buffer 224, a DRAM buffer 228A), and a non-volatile memory 306. When the memory device 240 executes a plurality of programs, resources of the memory controller 202, the device memory 304, and the non-volatile memory 306 are allocated to implement the plurality of programs based on the storage access and transport protocol (e.g., NVMe). A plurality of compute namespaces 404 (e.g., 404A and 404B) correspond to, are configured to provide, instructions of the plurality of programs executed by the one or more programs of the memory device 240. Resources of the device memory 304 are allocated based on a plurality of local memory namespaces 406 (e.g., 406A and 406B) to facilitate execution of the plurality of programs by the memory device 240, so are resources of the non-volatile memory 306 allocated based on a plurality of memory namespaces 408 (e.g., 408A and 408B). It is noted that, in some embodiments, the number of programs that can be concurrently executed is not limited to 2, and can be 3 or more. More than two namespaces can be created adaptively in each type of compute namespaces 404, 406, or 408.

In an example, a compute namespace 404A corresponds to a respective local memory namespace 406A and a respective non-volatile memory namespace 408A. The compute namespace 404A provides instructions of a corresponding program for execution by the one or more processors of the memory device 240. In some situations, input data that are processed, and output data that are generated, by these instructions are temporarily stored based on the local memory namespace 406A. In some situations, the input data are extracted based on the non-volatile memory namespace 408A, and the output data are stored based on the non-volatile memory namespace 408A. By these means, namespace allocation and utilization in the domain 402 corresponding to the memory device 240 are managed according to the storage access and transport protocol.

In some embodiments, the storage access and transport protocol includes a NVMe protocol for accessing flash storage (e.g., SSDs) via a PCI Express (PCIe) bus. The PCIe bus is configured to support a plurality of parallel command queues (e.g., on an order of 104 queues), thereby operating with a substantially high throughput and a substantially fast response time. In some embodiments, the host device 220 is configured to communicate and interact with each memory device 240 (e.g., SSD) as a standard NVMe storage device using the NVMe protocol. The host device 220 is configured to read and write data and implement data processing operations on the memory device 240 using NVMe commands.

In some embodiments, the host device 220 uses an operating system (e.g., a Linux operating system), and the CSRs 302 (FIG. 3) of the memory device 240 uses an embedded operating system (e.g., an embedded Linux operating system) that matches the operating system of the host device 220. In some embodiments, the host device 220 uses extended vendor unique commands to control and interact with the embedded operating system of the CSRs 302 of the memory device 240.

Figure 5:
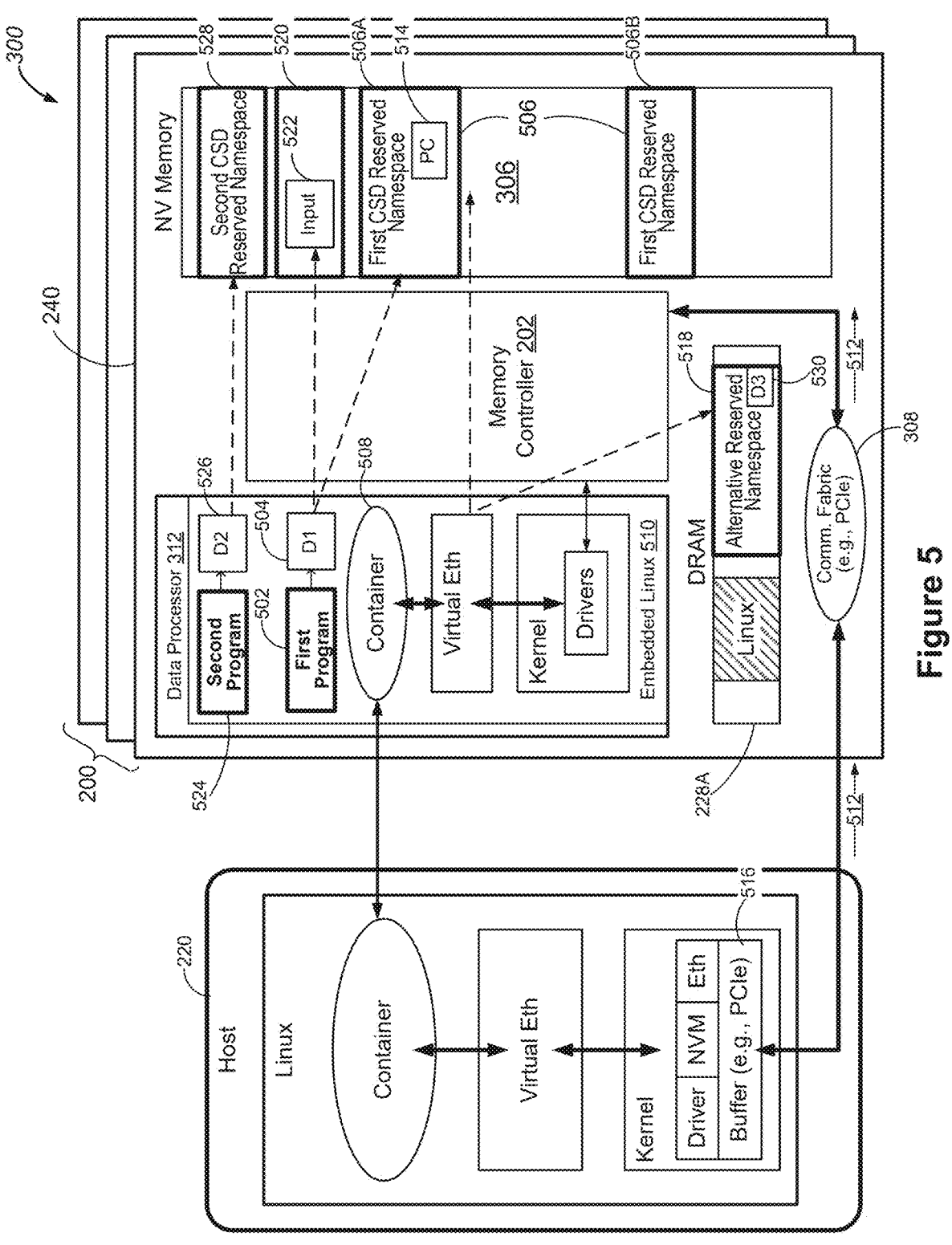
FIG. 5 is a block diagram of an example computer system that includes a memory device having internal data processing capability, in accordance with some embodiments.

FIG. 5 is a block diagram of an example computer system 300 that includes a memory device 240 having internal data processing capability, in accordance with some embodiments. The memory device 240 includes a memory controller 202, a data processor 312, and a non-volatile memory 306 having a plurality of memory blocks. Each memory block includes one or more memory pages 210 in a plurality of memory channels 204 of the memory device 240 (FIG. 2). The data processor 312 is distinct from the memory controller 202, and executes a first program 502 to process first data 504. In accordance with a determination that the first data 504 is processed by the first program 502, the memory device 240 (specifically, the data processor 312) stores the first data 504 in a first subset of the plurality of memory blocks 506. The first subset of the plurality of memory blocks has fixed physical locations in the non-volatile memory 306 and is reserved for the first program 502. In some embodiments, the first program 502 includes a set of instructions, which are compiled, interpreted, or executed. In an example, the first program 502 includes a firmware application. In some embodiments, the non-volatile memory 306 include SSD memory cells, and the memory device 240 includes an SSD drive. Alternatively, in some embodiments, the memory device 240 includes one of magnetoresistive random-access memory (MRAM), ferroelectric random-access memory (FeRAM), or any other type of memory.

In some embodiments, the first subset of the plurality of memory blocks 506 corresponds to a first CSD reserved namespace 506. Each memory block 506 of the non-volatile memory 306 includes a plurality of NAND memory cells. In some embodiments, each of the non-volatile memory 306 and a device memory 304 (e.g., DRAM buffer 228A, SRAM buffer 224) includes a respective dataspace reserved for the first program 502. Data (e.g., the first data 504) stored in the first subset of the plurality of memory blocks 506 include working data, and the respective dataspace reserved for the first program 502 acts as one of runtime memory, swap space, and a buffer for the first program 502. Further, in some embodiments, in each of the non-volatile memory 306 and the device memory 304 (e.g., DRAM buffer 228A, SRAM buffer 224), the respective dataspace (e.g., the subset of memory blocks 506) is static and fixed. Conversely, in some embodiments, in each of the memories 304 and 306, the respective dataspace (e.g., the subset of memory blocks 506) is dynamically assigned, e.g., based on a workload of the first program 502.

In some embodiments, the first program 502 is executed in a discrete container environment 508 that is set up within an operating system 510 (e.g., an embedded Linux operating system), and the first CSD reserved namespace 506 is reserved for the first program 502 without being shared with any other application. Conversely, in some embodiments, the first CSD reserved namespace 506 is reserved for the first program 502, and shared with one or more distinct programs executed by the data processor 312.

In some embodiments, the first CSD reserved namespace 506 is created on the non-volatile memory 306 for the first program 502 by the memory controller 202 of the memory device 240. The memory controller 202 receives, from a host device 220, an instruction 512 to reserve the first subset of the plurality of memory blocks 506 for the first program 502. The memory controller 202 identifies the fixed physical locations of the first subset of the plurality of memory blocks 506 in the non-volatile memory 306, and reserves the first subset of the plurality of memory blocks 506 for the first program 502. Further, in some embodiments, when the first subset of the plurality of memory blocks 506 is reserved for the first program 502, the first subset of the plurality of memory blocks 506 is reconfigured to one of SLC, MLC, TLC, QLC, and PLC memory cells, e.g., independently of other memory blocks in the non-volatile memory 306. In some embodiments, the first subset of the plurality of memory blocks 506 may be reconfigured to N-level-cell memory cells, where N is greater than 5. In some embodiments, the first subset of the plurality of memory blocks 506 is dynamically reconfigured to SLC or QLC memory cells, e.g., independently of other memory blocks in the non-volatile memory 306.

In some embodiments, the memory controller 202 determines whether the non-volatile memory 306 satisfies a firmware reservation criterion. The CS reserved namespace 506 is created to reserve the first subset of the plurality of memory blocks in accordance with a determination that the firmware reservation criterion is satisfied. In an example, the firmware reservation criterion requires that a size of free space in the non-volatile memory 306 is greater than a free space threshold level (e.g., 75%). Conversely, in some embodiments, the memory controller 202 determines that the size of free space in the volatile memory 306 is less than the free space threshold level (e.g., 75%), and aborts creation of the CS reserved namespace 506 in the non-volatile memory 306.

In some embodiments, the host device 220 issues a host instruction. In response to the host instruction, the memory controller 202 moves data stored in the plurality of memory blocks of the non-volatile memory 306 to consolidate the first subset of the plurality of memory blocks 506. The fixed physical locations of the first subset of the plurality of memory blocks are successive to one another. Alternatively, in some embodiments, in response to a host instruction, the memory controller 202 moves data stored in the plurality of memory blocks of the non-volatile memory 306 to partially consolidate the first subset of the plurality of memory blocks 506. At least two of the fixed physical locations of the first subset of the plurality of memory blocks 506 are not successive to one another. For example, the first subset of memory blocks 506 includes a first memory block 506A and a second memory block 506B that are not immediately adjacent to each other in the non-volatile memory 306.

In some embodiments, the fixed physical locations of the first subset of the plurality of memory blocks 506 are identified in the non-volatile memory 306 without moving data stored in the plurality of memory blocks. Further, in some embodiments, the first subset of memory blocks 506 has successive physical addresses. Alternatively, in some embodiments, the first subset of memory blocks 506 is distributed in the non-volatile memory 306.

In some embodiments, the memory controller 202 stores program codes 514 of the first program 502. Prior to executing the first program 502 in the data processor 312, the program codes 514 of the first program 502 are loaded in the data processor 312. In some embodiments, the host device 220 uses an operating system (e.g., a Linux operating system), and the CSRs 302 (FIG. 3) of the memory device 240 uses an embedded operating system (e.g., an embedded Linux operating system) that matches the operating system of the host device 220. The host device 220 is coupled to the memory device 240 via a communication fabric 308 that includes a communication bus 140 (FIG. 1) using a PCIe data transfer protocol. The host device provides the program codes 514 of the first program 502 to the memory controller 202 of the memory device 240 via the communication fabric 308. More specifically, in some embodiments, the host device 220 stores the program codes 514 of the first program 502 in a host buffer 516 (e.g., that complies with the PCIe data transfer protocol). The program codes 514 are transferred via the communication fabric 308, and stored into the first subset of memory blocks 506 associated the first CSD reserved namespace 506.

In some embodiments, the first subset of the plurality of memory blocks 506 is configured to be managed by a Temporary File System (TFS). The TFS System has a TFS paradigm, e.g., implemented in the embedded Unix operating systems, and includes a mounted file system. In some embodiments, the first subset of the plurality of memory blocks 506 includes a swap space or an input/output buffer of the first program 502. In some embodiments, the swap space (also called swap file) is used as virtual memory containing process memory images. Whenever the data processor 312 runs short of the device memory (e.g., the DRAM buffer 228A or the SRAM buffer 224), the data processor 312 uses its swap memory and stores the first data 504 in the subset of memory blocks 506. The swap space helps the operating system 510 of the data processor 312 in pretending that it has more device memory than the device memory the memory device 240 has. It is also called a swap file. This interchange of data between virtual memory (e.g., the first CSD reserved namespace 506) and the device memory 304 is called swapping, and space on in non-volatile memory is called "swap space." In some embodiments, the input/output buffer enabled by the first subset of the plurality of memory blocks 506 facilitates buffering that occurs between the data processor 312 (e.g., which produces the first data 504) and an alternative device (e.g., a host device 220, which receives the first data 504). In an example, this input/output buffer is applied in accordance with a determination that the data processor 312 and the alternative device has a difference in a data processing or communication rate.

In these embodiments, the TFS, swap space, and/or input/output buffer of the first program 502 are implemented in the non-volatile memory 306 at a relatively slower access rate compared with in the DRAM memory 228A. Alternatively or additionally, in some embodiments, the data processor 312 corresponds to an alternative reserved namespace 518 reserved in the DRAM buffer 228A. The TFS, swap space, and/or input/output buffer of the first program 502 are implemented in the DRAM memory 228A. In other words, the reserved namespaces 506 and 518 may be reserved in both the non-volatile memory 306 and the device memory 304.

In some embodiments, the fixed physical locations of the first subset of the plurality of memory blocks 506 in the non-volatile memory 306 are separate from a host device 220, which is coupled to the memory device 240 and a flash translation layer of the memory controller 202. The flash translation layer includes a hardware and software layer located in the memory controller 220 of the memory device 240. In some embodiments, the flash translation layer corresponds to a flash memory type, and the memory device 240 includes one of an SSD, a universal serial bus (USB) flash drive, and a secure digital (SD) card. In some embodiments, the memory device 240 includes an L2P address indirection table 250 that stores physical addresses for a set of logical addresses (e.g., an LBA). The L2P address indirection table 250 does not include any physical address entries directed to the first subset of the plurality of memory blocks 506. The memory device 240 is disabled from accessing (e.g. both reading from and writing into) the first subset of memory blocks 506 reserved for the first program 502. In some embodiments, the memory device 240 is disabled from writing into the first subset of memory blocks 506, and however, allowed to reading from the first subset of memory blocks 506. Likewise, in some embodiments, the host device 220 is disabled from writing into the first subset of memory blocks 506, and however, allowed to reading from the first subset of memory blocks 506. In some embodiments, the host device 220 is disabled from writing into, and reading from, the first subset of memory blocks 506.

In some embodiments, data stored in the reserved namespace 506 are made available to the host device 220 or the memory controller 202 of the memory device 240 via the DRAM buffer 228A. For example, the data processor 312 copies the first data 504 stored in the reserved namespace 506 into the DRAM buffer 228A from which the host device 220 or the memory controller 202 obtains the first data 504.

In some embodiments, the memory device 240 (specifically, the memory controller 202) determines a workload level of the first program 502. Based on the workload level of the first program 502, the first subset of memory blocks 506 is dynamically reserved for the first program 502. The first subset of memory blocks 506 is created with a memory size sufficient to support the workload level of the first program 502 that may be determined for current operations or predicted for subsequent operations. A predicted workload level takes into consideration potential bursts of workload in the first program 502. In some situations, the workload level of the first program 502 is tracked, and the first subset of memory blocks 506 is dynamically adjusted based on the tracked workload level of the first program 502 in real time or with a delay.

In some embodiments, the first program 502 is executed as a virtual or containerized workload by the data processor 312. The data processor 312 executes an operating system 510, which includes a container environment 508. The first program 502 is executed in the container environment 508. Further, in some embodiments, the first CSD reserved namespace 506 (e.g., corresponding to the first subset of memory blocks 506) is reserved for the first program 502 without being shared with any other application. Conversely, in some embodiments, the first CSD reserved namespace 506 is reserved for the first program 502, and shared with one or more distinct programs executed by the data processor 312.

In some embodiments, the first subset of the plurality of memory blocks 506 is entirely made of SLC memory cells. A remaining subset of memory blocks 520 is distinct from the first subset of the plurality of memory blocks, and is entirely made of QLC memory cells. Conversely, in some embodiments, both the first subset 506 of the plurality of memory blocks and a remaining subset of memory blocks 520 that are distinct from the first subset of the plurality of memory blocks have the same type of memory cells. In an example, the remaining subset of memory blocks 520 is complementary to the first subset of memory blocks 506 in the non-volatile memory 306. In another example, the non-volatile memory 306 further includes one or more memory blocks that are distinct from the first subset of memory blocks 506 and the remaining subset of memory blocks 520.

In some embodiments, in response to detection of input data 522 that are periodically stored in a remaining subset of memory blocks 520 that are distinct from the first subset of the plurality of memory blocks 506, the data processor 312 automatically obtains the input data 522 stored in the remaining subset of memory blocks 520 and processes the input data 522 to generate the first data 504. In some embodiments, the data processor 312 obtains the input data 522 directly from the remaining subset of memory blocks 520. Conversely, in some embodiments, the data processor 312 obtains the input data 522 via the memory controller 202. The memory controller 202 creates a copy of the input data 522 and stores the copy in the alternatively reserved namespace 518 of the DRAM buffer 228A. The data processor 312 extracts the copy of the input data 522 from the alternatively reserved namespace 518.

In some embodiments, the first data 504 include output data of a neural network used by the first program 502. The input data 522 of the neural network are stored in a remaining subset of memory blocks 520 that are distinct from the first subset of the plurality of memory blocks 506. The data processor 312 obtains the input data 522 stored in a remaining subset of memory blocks 520, processes the input data 522 using the neural network to generate the first data 504, and stores the first data 504 in the first subset of memory blocks 506. In some embodiments, the first data 504 include weights of a neural network used by the first program 502, and the weights of the neural network are stored in, and loaded from, the first subset of memory blocks 506. Alternatively, in some embodiments, the weights of the neural network are stored in, and loaded from, the remaining subset of memory blocks 520.

In some embodiments, the data processor 312 executes a second program 524 to process second data 526. In accordance with a determination that the second data 526 is processed by the second program 524, the second data is stored in a second subset of memory blocks 528 distinct from the first subset of the plurality of memory blocks 506. The second subset of memory blocks 528 corresponds to a second CSD reserved namespace 528. In some embodiments, the second program 524 includes a set of instructions, which are compiled, interpreted, or executed. In an example, the first program 524 includes a firmware application.

In some embodiments, the memory device 240 further includes dynamic random-access memory (DRAM) 228A. In accordance with a determination that third data 530 is processed by the first program 502, the third data 530 are stored in an alternative reserved namespace 518 corresponding to a subset of the DRAM buffer 228. The subset of the DRAM buffer 228A has a fixed physical location within in the DRAM buffer 228A and is reserved for the first program 502. In some embodiments, the third data 530 include intermediate data that are temporarily stored in the DRAM buffer 228A, and are further processed to generate the first data 504 to be stored in the first CSD reserved namespace 506. Alternatively, in some embodiments, the third data 530 include the first data 504. The first data 504 are stored in the DRAM buffer 228A first, then moved to the volatile memory 306. In an example, the first data 504 are stored in the reserved namespace 518 of the DRAM buffer 228A and further moved to the reserved space 506 of an SSD. Further, in some embodiments, the alternative reserved namespace 518 (e.g., corresponding to the subset of the DRAM buffer 228) includes a swap space or an input/output buffer of the first program 502.

Figure 6:
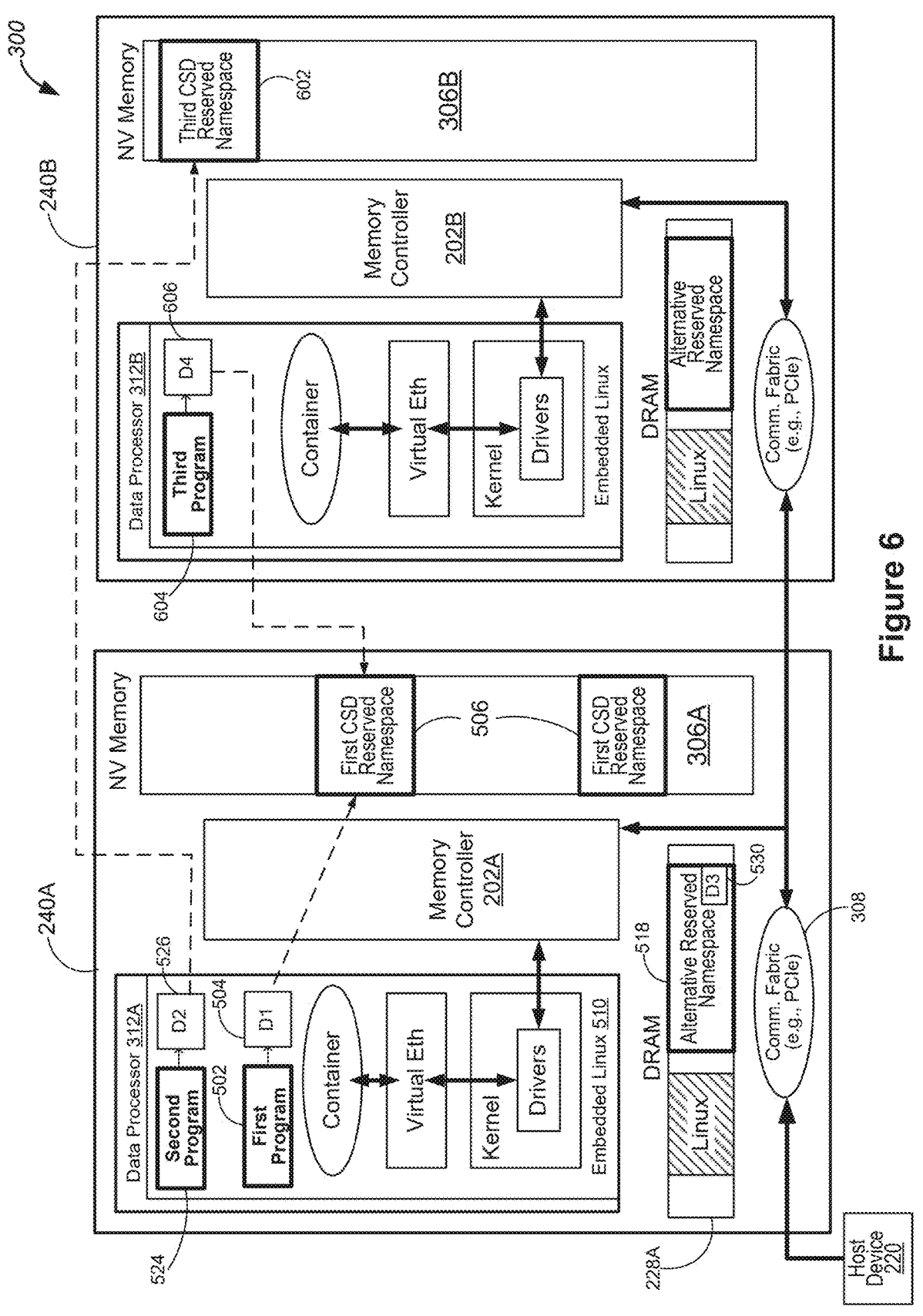
FIG. 6 is a block diagram of an example computer system including a memory system having internal data processing capability, in accordance with some embodiments.

FIG. 6 is a block diagram of an example computer system 300 including a memory system 200 having internal data processing capability, in accordance with some embodiments. The memory system 200 includes a first memory device 240A and a second memory device 240B. The first memory device 240A includes a first memory controller 202A, a first data processor 312A, and a first non-volatile memory 306A having a plurality of memory blocks. The second memory device 240B includes a second memory controller 202B, a second data processor 312B, and a second non-volatile memory 306B. Each memory block further includes one or more memory pages 210 in a plurality of memory channels 204 of the respective memory device 240A or 240B (FIG. 2). In the first memory device 240A, the first data processor 312A is distinct from the first memory controller 202A, and executes a first program 502 to process first data 504. In accordance with a determination that the first data 504 is processed by the first program 502, the first memory device 240A (specifically, its associated data processor 312) stores the first data 504 in a first subset of the plurality of memory blocks 506. The first subset of the plurality of memory blocks has fixed physical locations in the first non-volatile memory 306A of the first memory device 240A and is reserved for the first program 502. In some embodiments, a host device 220 is coupled to the memory devices 240A and 240B via a communication fabric 308 that includes a communication bus 140 (FIG. 1) using a PCIe data transfer protocol.

Referring to FIG. 6, in some embodiments, the data processor 312 of the first memory device 240A executes a second program 524 to process second data 526. In accordance with a determination that the second data 526 is processed by the second program 524, the second data 526 is stored in a subset of a non-volatile memory 306B (e.g., a third CSD reserved namespace 602) of a second memory device 240B. The subset of the non-volatile memory 306B of the second memory device 240B has fixed physical locations in the non-volatile memory 306B of the second memory device 240B and is reserved for the second program 524 loaded in the data processor 312 of the first memory device 240A. Further, in some embodiments, the data processor 312 of the first memory device 240A stores the second data 526 in an alternative reserved namespace 518 of the first memory device 240, and the memory controller 202 of the first memory device 202 obtains the second data 526 from the alternative reserved namespace 518 and sends the second data 526 to the second memory device 240B via the communication fabric 308. The second memory device 240B stores the second data 526 in the third CSD reserved namespace 602 of the second program 524.

In some embodiments, the second data processor 312B of the second memory device 240B executes a third program 604 to process fourth data 606. In accordance with a determination that the fourth data 606 are processed by the third program, the fourth data 606 are stored in the first subset of the plurality of memory blocks 506 reserved for the first program 502 in the first memory device 240A. Stated another way, in some embodiments, a set of memory blocks of a non-volatile memory of a memory device (e.g., the first CSD reserved namespace 506) is shared by a plurality of programs (e.g., 502 and 604) that are executed in two or more memory devices 240 (e.g., 240A and 240B) located in the same memory system 200. In some embodiments, the third program 604 includes a set of instructions, which are compiled, interpreted, or executed. In an example, the third program 604 includes a firmware application.

In some embodiments not shown, a set of memory blocks of a non-volatile memory of a memory device is shared by a plurality of programs that are executed in the same memory device. In some embodiments not shown, a set of memory blocks of a non-volatile memory of a memory device is shared by a plurality of programs that are executed in two or more memory devices that are distinct from the memory where the set of memory blocks are located.

It is noted that, in some embodiments, different functional blocks illustrated in FIGS. 5 and 6 correspond to different namespaces of the memory system 200. The different namespaces of the memory system 200 could be reserved or hidden logically, while being mapped normally to (e.g., interleaved with) namespaces of the host device 220.

FIG. 7 is a flow diagram of an example method 700 for managing memory space, in accordance with some embodiments. The method 700 is implemented at a memory device 300 (FIGS. 3, 5, and 6) to manage space of volatile memory in support of data processing in the memory device 300. The memory device 240 includes (operation 702) a memory controller 202, a data processor 312, and a non-volatile memory 306 having a plurality of memory blocks (FIG. 5). The data processor 312 of the memory device 240 executes (operation 704) a first program 502 to process first data 504. The data processor 312 is distinct from the memory controller 202. In accordance with a determination that the first data 504 is processed by the first program 502, the data processor 312 stores (operation 706) the first data 504 in a first subset of the plurality of memory blocks 506. The first subset of the plurality of memory blocks 506 has (operation 708) fixed physical locations in the non-volatile memory 306 and is reserved for the first program 502. In some embodiments, the non-volatile memory 306 include SSD memory cells, and the memory device 240 includes an SSD drive. Alternatively, in some embodiments, the memory device 240 includes one of magnetoresistive random-access memory (MRAM), ferroelectric random-access memory (FeRAM), or any other type of memory.

In some embodiments, the memory controller 202 receives, from a host device 220, an instruction to reserve the first subset of the plurality of memory blocks 506 for the first program 502, identifies the fixed physical locations of the first subset of the plurality of memory blocks 506 in the non-volatile memory 306, and reserves the first subset of the plurality of memory blocks 506 for the first program 502. Further, in some embodiments, the memory controller 202 reserves the first subset of the plurality of memory blocks 506 for the first program 502 by reconfiguring the first subset of the plurality of memory blocks 506 to one of SLC, MLC, TLC, QLC, and PLC memory cells. In some embodiments, the memory device 240 the memory controller 202 determines whether the non-volatile memory 306 satisfies a firmware reservation criterion. The first subset of the plurality of memory blocks 506 is reserved in accordance with a determination that the firmware reservation criterion is satisfied. Further, in some embodiments, the firmware reservation criterion requires that a size of free space in the non-volatile memory 306 is greater than a free space threshold level.

In some embodiments, in response to a host instruction, the memory controller 202 moves (operation 710) data stored in the plurality of memory blocks to consolidate the first subset of the plurality of memory blocks 506. The fixed physical locations of the first subset of the plurality of memory blocks 506 are successive to one another. Alternatively, in some embodiments, in response to a host instruction, the memory controller 202 moves data stored in the plurality of memory blocks to partially consolidate the first subset of the plurality of memory blocks 506. At least two of the fixed physical locations of the first subset of the plurality of memory blocks 506 are not successive to one another. Alternatively, in some embodiments, the fixed physical locations of the first subset of the plurality of memory blocks 506 are identified in the non-volatile memory 306 without moving data stored in the plurality of memory blocks.

In some embodiments, the memory controller 202 stores program codes 514 of the first program 502 in the first subset of the plurality of memory blocks 506. Prior to executing the first program 502 in the data processor 312, the program codes 514 of the first program 502 are loaded in the data processor 312.

In some embodiments, the first subset of the plurality of memory blocks 506 is configured to be managed by a Temporary File System.

In some embodiments, the first subset of the plurality of memory blocks 506 includes a swap space or an input/output buffer of the first program 502.

In some embodiments, the fixed physical locations of the first subset of the plurality of memory blocks 506 are separate from a host device 220, which is coupled to the memory device 240 and a flash translation layer of the memory controller 202.

In some embodiments, the memory device 240 determines (operation 712) a workload level of the first program 502. Based on the workload level of the first program 502, the memory device 240 dynamically reserves (operation 714) the first subset of the plurality of memory blocks 506 for the first program 502.

In some embodiments, the first program 502 is executed as a virtual or containerized workload by the data processor 312.

In some embodiments, the first subset of the plurality of memory blocks is entirely made of one of two types of memory cells, and an alternative subset of memory blocks that are distinct from the first subset of the plurality of memory blocks is entirely made of the other one of the two types of memory cells, the two types of memory cells including SLC memory cells and QLC memory cells. More specifically, in some embodiments, the first subset of the plurality of memory blocks 506 is entirely made of SLC memory cells, and the alternative subset of memory blocks 520 is entirely made of QLC memory cells. Alternatively, in some embodiments, the first subset of the plurality of memory blocks 506 is entirely made of QLC memory cells, and the alternative subset of memory blocks 520 is entirely made of SLC memory cells.

In some embodiments, both the first subset of the plurality of memory blocks 506 and a remaining subset of memory blocks 520 that are distinct from the first subset of the plurality of memory blocks 506 have the same type of memory cells.

In some embodiments, the memory device 240 includes (operation 716) a first memory device 240A (FIG. 6). The data processor 312 of the first memory device 240A executes (operation 718) a second program 524 to process second data 526. In accordance with a determination that the second data 526 are processed by the second program 524, the second data 526 are stored (operation 720) in a subset of a non-volatile memory 306 of a second memory device 240B (e.g., in a third CSD reserved namespace 602 in FIG. 6). The subset of the non-volatile memory 306 of the second memory device 240B has (operation 722) fixed physical locations in the non-volatile memory 306 of the second memory device 240B and is reserved for the second program 524.

In some embodiments, the memory device 240 includes a first memory device 240A (FIG. 6). A data processor 312 of a second memory device 240B executes a third program 604 to process fourth data 606. In accordance with a determination that the fourth data 606 are processed by the third program 604, the fourth data 606 are stored in the first subset of the plurality of memory blocks 506 reserved for the first program 502 in the first memory device 240A.

In some embodiments, in response to detection of input data 522 that are periodically stored in a remaining subset of memory blocks 520 that are distinct from the first subset of the plurality of memory blocks 506, the data processor 312 automatically obtains the input data 522 stored in the remaining subset of memory blocks 520 and processes the input data 522 to generate the first data 504.

In some embodiments, the first data 504 include output data of a neural network. The memory device 240 obtains input data 522 stored in a remaining subset of memory blocks 520 that are distinct from the first subset of the plurality of memory blocks 506 and processes the input data 522 using the neural network to generate the output data.

In some embodiments, the data processor 312 executes a second program 524 to process second data 526. In accordance with a determination that the second data 526 is processed by the second program 524, the second data 526 are stored in a second subset of memory blocks 528 (e.g. a second CSD reserved namespace 528 in FIG. 5) distinct from the first subset of the plurality of memory blocks 506.

In some embodiments, the memory device 240 further includes dynamic random-access memory (DRAM) 228A. In accordance with a determination that third data 530 is processed by the first program 502, the third data 530 are stored in a subset of the DRAM 228A (e.g., in an alternative reserved namespace 518 in FIG. 5). The subset of the DRAM has a fixed physical location within in the DRAM 228A and is reserved for the first program 502. Further, in some embodiments, the subset of the DRAM includes a swap space or an input/output buffer of the first program 502.

Various embodiments of this application are directed to methods, systems, devices, non-transitory computer-readable media for reserving part of a nonvolatile memory of a memory device to facilitate implementations of data processing operations locally in the memory device. The memory device is transformed to a computational storage device (CSD) by incorporating a data processor. The data processor is configured to manage internal computational workloads (e.g., the data processing operations) locally on the memory device 240, while a memory controller of the memory device 240 specializes in performing memory access functions and internal memory management functions. Part of the nonvolatile memory of the memory device is reserved as working memory of the data processor of the memory device. In an example, the memory device is configured to implement data processing using a neural network based model, and the working memory reserved for the data processor helps the data processor of the memory device process data stored into the memory device automatically using the neural network based model and locally in the memory device.

Some implementations of this application are directed to creating local working memory for a memory system (e.g., an SSD memory system) using its memory blocks (e.g., including a plurality of NAND memory cells). The local working memory includes a set of private memory blocks, and may support one or more of a temporary file system, a swap space, and an input and output buffer. In some embodiments, the private memory blocks are invisible to a host device coupled to the memory system or the memory controller of the memory system, and the host device and the memory controller of the memory system may not read or write directly from the private memory blocks. In some embodiments, the local working memory is fixed, e.g., independently of a workload of the data processor of the memory system. Conversely, in some embodiments, the local working memory is dynamically allocated based on a workload of the data processor of the memory system. In some embodiments, the local working memory is formatted to one of single-level cell (SLC) memory, multi-level cell (MLC) memory, triple-level cell (TLC) memory, quad-level cell (QLC) memory, penta-level cell (PLC) memory, and higher-level cell memory. Further, in some embodiments, the local working memory is dynamically formatted as single-level cell (SLC) memory or quad-level cell (QLC) memory. In some embodiments, the data processor of the memory system is configured to process virtual or containerized workloads. In some embodiments, two or more distinct memory devices of the memory system have distinct data processors, and the distinct data processors share the local working memory reserved in the non-volatile memory of one of the distinct memory devices in the memory system.

In some embodiments, a method or an apparatus reserves memory space and provides a private namespace within a memory device 240 (e.g., an SSD having a data processor that executes artificial intelligence (AI) based operations). The private namespace provides an independent allocation of the first CSD reserved namespace 506, which serves as working memory for a computational workload running on the memory device 240. In some embodiments, this private namespace allocation is not accessible to the host device 220 for data storage, nor is it accessible to the memory controller 202 for data storage. Further, in some embodiments, the host device 220 and the memory controller 202 cannot write into the private namespace allocations, and however, can read from the private namespace allocations.

In accordance with at least some embodiments disclosed herein is the realization that a key need of a computational program is working memory. SSDs store data in fragmented fashion in memory blocks without knowledge of the structure of the underlying data or filesystem metadata. Some implementations of this application provide a formatted private namespace the computational workload can use as working memory. For example, the private namespace corresponds to an isolated allocation in NAND flash memory. In some embodiments, a NAND memory allocation is reserved in a fixed static manner by an edge CSD. The edge CSD is an endpoint memory device, e.g., on the network communicatively coupled to a server. In an example, the edge CSD is a standalone SSD memory device or an SSD device applied in a mobile device (e.g., a laptop computer, a desktop computer, a tablet computer, a mobile phone). The edge CSD is configured to perform memory access functions, internal memory management functions, and internal data processing operations (e.g., machine learning operations using neural network).

In some embodiments, reservation of private namespace is controlled by the host device 220. In some embodiments, reservation of private namespace is dynamic in nature allowing sizes of the reserved namespaces (e.g., namespaces 506, 528, and 602) to change based on dynamic usage. In some embodiments, the reserved namespace 506 is used as one or more of: a temporary file system, a swap space, and an input and output buffer for implementing a workload of an edge CSD.

In some embodiments, a private namespace is shared by two or more edge CSDs providing a larger or temporary larger memory capacity. In an example, the first reserved namespace 506 is shared by the first program 502 of the first memory device 240A and the third program 604 of the second memory device 240B. In another example, the second program 524 of the first memory device 240A applies a second CSD reserved namespace 528 on the first memory device 240A, a third CSD reserved namespace 602, or both of them.

In some embodiments, each private namespace (e.g., reserved namespace 506, 528, or 602) is isolated and managed to optimize for cycling limitations of an SSD drive. In some embodiments, each private namespace is configured provide multi-media buffers. For example, SLC buffers are applied for high input and output performance, and QLC buffers are applied for higher storage density despite of lower input and output performance.

In some embodiments, machine learning workloads are implemented locally on a data processor of an edge CSD using neural networks. A reserved namespace may serve as working memory directly for a machine learning workload, allowing the workload to be implemented natively on the edge CSD. A data processor (e.g., data processor 312 in FIGS. 5 and 6) of the edge CSD processes the machine learning workloads using an edge CSD SSD workload container (e.g., container 508 in FIG. 5) in a virtualized edge CSD SSD environment.

Memory is also used to store instructions and data associated with the method 700, and includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 700.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for memory space management, comprising:
at a memory device including a memory controller, a data processor, and a non-volatile memory having a plurality of memory blocks:
    reserving a first subset of the plurality of memory blocks for a first program;
    executing, by the data processor of the memory device, the first program to process first data, the data processor being distinct from the memory controller; and
    in accordance with a determination that the first data is processed by the first program, storing the first data in the first subset of the plurality of memory blocks, wherein the first subset of the plurality of memory blocks has fixed physical locations in the non-volatile memory;
    wherein the first subset of the plurality of memory blocks is configured to be managed by a temporary file system.

2. The method of claim 1, further comprising, at the memory controller:
    receiving, from a host device, an instruction to reserve the first subset of the plurality of memory blocks for the first program; and
    identifying the fixed physical locations of the first subset of the plurality of memory blocks in the non-volatile memory.

3. The method of claim 2, reserving the first subset of the plurality of memory blocks for the first program further comprising:
    reconfiguring the first subset of the plurality of memory blocks to one of SLC, MLC, TLC, QLC, and PLC memory cells.

4. The method of claim 2, further comprising, at the memory controller:
    determining whether the non-volatile memory satisfies a firmware reservation criterion, wherein the first subset of the plurality of memory blocks is reserved in accordance with a determination that the firmware reservation criterion is satisfied.

5. The method of claim 4, wherein the firmware reservation criterion requires that a size of free space in the non-volatile memory is greater than a free space threshold level.

6. The method of claim 1, further comprising, in response to a host instruction:
    moving, by the memory controller, data stored in the plurality of memory blocks to consolidate the first subset of the plurality of memory blocks, wherein the fixed physical locations of the first subset of the plurality of memory blocks are successive to one another.

7. The method of claim 1, further comprising, in response to a host instruction:
    moving, by the memory controller, data stored in the plurality of memory blocks to partially consolidate the first subset of the plurality of memory blocks, wherein at least two of the fixed physical locations of the first subset of the plurality of memory blocks are not successive to one another.

8. The method of claim 1, wherein the fixed physical locations of the first subset of the plurality of memory blocks are identified in the non-volatile memory without moving data stored in the plurality of memory blocks.

9. The method of claim 1, further comprising:
    storing, by the memory controller, program codes of the first program in the first subset of the plurality of memory blocks; and
    prior to executing the first program in the data processor, loading the program codes of the first program in the data processor.

10. The method of claim 1, further comprising implementing the temporary file system in an embedded operating system executed by the data processor, wherein the temporary file system includes a mounted file system.

11. The method of claim 1, wherein the first subset of the plurality of memory blocks includes a swap space or an input/output buffer of the first program.

12. The method of claim 1, wherein the fixed physical locations of the first subset of the plurality of memory blocks are separate from a host device, which is coupled to the memory device and a flash translation layer of the memory controller.

13. A non-transitory computer-readable storage medium, having instructions stored thereon, which when executed by a memory device cause the memory device to:

at the memory device, wherein the memory device includes a memory controller, a data processor, and a non-volatile memory having a plurality of memory blocks:

reserving a first subset of the plurality of memory blocks for a first program;

executing, by the data processor of the memory device, the first program to process first data, the data processor being distinct from the memory controller; and in accordance with a determination that the first data is processed by the first program, storing the first data in the first subset of the plurality of memory blocks, wherein the first subset of the plurality of memory blocks has fixed physical locations in the non-volatile memory:

wherein the first subset of the plurality of memory blocks is configured to be managed by a temporary file system.

14. The non-transitory computer-readable storage medium of claim 13, wherein the memory device includes a first memory device, and the non-transitory computer-readable storage medium further comprises instructions for:

executing, by the data processor of the first memory device, a second program to process second data; and in accordance with a determination that the second data are processed by the second program, storing the second data in a subset of a non-volatile memory of a second memory device, wherein the subset of the non-volatile memory of the second memory device has fixed physical locations in the non-volatile memory of the second memory device and is reserved for the second program.

15. The non-transitory computer-readable storage medium of claim 13, wherein the memory device further includes dynamic random-access memory (DRAM), and the non-transitory computer-readable storage medium further comprises instructions for:

in accordance with a determination that third data is processed by the first program, storing the third data in a subset of the DRAM, wherein the subset of the DRAM has a fixed physical location within in the DRAM and is reserved for the first program.

16. The non-transitory computer-readable storage medium of claim 13, wherein the non-transitory computer-readable storage medium further comprises instructions for:

determining a workload level of the first program; and based on the workload level of the first program, dynamically reserving the first subset of the plurality of memory blocks for the first program.

17. A memory device, comprising:

a memory controller;

a data processor distinct from the memory controller;

a non-volatile memory coupled to the memory controller and having a plurality of memory blocks; and memory having instructions stored thereon for:

reserving a first subset of the plurality of memory blocks for a first program;

executing, by the data processor of the memory device, the first program to process first data, the data processor being distinct from the memory controller; and in accordance with a determination that the first data is processed by the first program, storing the first data in the first subset of the plurality of memory blocks, wherein the first subset of the plurality of memory blocks has fixed physical locations in the non-volatile memory;

wherein the first subset of the plurality of memory blocks is configured to be managed by a temporary file system.

18. The memory device of claim 17, wherein the first program is executed as a virtual or containerized workload by the data processor.

19. The memory device of claim 17, wherein the first subset of the plurality of memory blocks is entirely made of one of two types of memory cells, and an alternative subset of memory blocks that are distinct from the first subset of the plurality of memory blocks is entirely made of the other one of the two types of memory cells, the two types of memory cells including SLC memory cells and QLC memory cells.

20. The memory device of claim 17, wherein both the first subset of the plurality of memory blocks and a remaining subset of memory blocks that are distinct from the first subset of the plurality of memory blocks have the same type of memory cells.

* * * * *